(12) United States Patent
Satoh et al.

(10) Patent No.: US 6,205,905 B1
(45) Date of Patent: Mar. 27, 2001

(54) BRAKE BOOSTER

(75) Inventors: Tohru Satoh; Makoto Watanabe, both of Saitama-Ken; Shigeo Shingyoji; Masaru Konishi, both of Kanagawa-Ken, all of (JP)

(73) Assignees: Jidosha Kiki Co., Ltd., Tokyo; Nissan Motor Co., Ltd., Yokohama, both of (JP)

( * ) Notice: Subject to any disclaimer, the term of this patent is extended or adjusted under 35 U.S.C. 154(b) by 0 days.

(21) Appl. No.: 09/167,139

(22) Filed: Oct. 6, 1998

(30) Foreign Application Priority Data

Oct. 17, 1997 (JP) .................................................... 9-303583
Oct. 17, 1997 (JP) .................................................... 9-303584
Oct. 17, 1997 (JP) .................................................... 9-303585

(51) Int. Cl.[7] ........................................................ F15B 13/16
(52) U.S. Cl. ............................................................ 91/369.2
(58) Field of Search .................................. 91/369.1, 369.2

(56) References Cited

U.S. PATENT DOCUMENTS 5,823,089 * 10/1998 Inoue et al. ........................ 91/369.2
5,943,937 * 9/1999 Endo .................................. 91/369.2

FOREIGN PATENT DOCUMENTS 8-85442    2/1996  (JP) .

* cited by examiner

Primary Examiner—Edward K. Look
Assistant Examiner—Thomas E. Lazo
(74) Attorney, Agent, or Firm—Flynn, Thiel, Boutell & Tanis, P.C.

(57) ABSTRACT

Reaction transmitting means of a brake booster includes a parallel combination of a first and a second reaction transmitting path each transmitting a brake reaction from a reaction disc to a valve plunger. The first reaction transmitting path includes a spring charged to a preset load, and the second reaction transmitting path includes a viscoelastic member as may be formed of rubber. With this construction, a hysteresis is obtained in both a low range of servo ratio during an initial phase of operation of a brake booster and a higher range of servo ratio during a later phase of operation, which occur before and after the spring in the reaction transmitting mechanism is compressed, thus allowing a good brake feeling to be maintained.

15 Claims, 8 Drawing Sheets

BRAKE BOOSTER

FIELD OF THE INVNETION

The invention relates to a brake booster, and more particularly, to a brake booster which is provided with reaction transmitting means including a spring.

DESCRIPTION OF THE PRIOR ART

A brake booster is known in the art which exhibits a reduced servo ratio during the initial phase of the braking operation of the brake booster and exhibits an increased servo ratio during a later phase of the braking operation.

In a brake booster of the kind described, reaction transmitting means is interposed between a reaction disc and a valve plunger, and comprises a first and a second retainer disposed to be displaceable relative to each other, a spring disposed between the first and the second retainer and charged to a preset load to maintain the both retainers spaced apart normally, and a stop member which prevents the first and the second retainer from being spaced apart beyond a given spacing (Japanese Lead-Open Patent Application No. 85,442/1996).

With this construction, when a brake pedal is depressed to actuate the brake booster, the reaction transmitting means merely transmits a brake reaction which is transmitted from the reaction disc to the valve plunger through the first retainer, the spring and the second retainer until the spring within the reaction transmitting means is compressed, whereby the prevailing servo ratio can be maintained relatively low. This improves the maneuverability in a range where a braking force of a reduced magnitude is required.

On the other hand, when the spring within the reaction transmitting means is compressed, the second retainer and the valve plunger will be advanced relative to the first retainer and the plate plunger by an amount corresponding to the compression of the spring, and accordingly, this is equivalent to a further depression of the brake pedal by an amount corresponding to the compression of the spring. The prevailing servo ratio can be chosen relatively high, thereby allowing a braking force of an increased magnitude to be obtained with a reduced force of depression.

Because the reaction disc comprises a viscoelastic member such as rubber, the brake booster incorporating the reaction disc exhibits a hysteresis, a phenomenon that the magnitude of an output from the brake booster becomes different upon depression and upon release of the brake pedal if the force with which the brake pedal is depressed is maintained same.

In the presence of the hysteresis, if a driver unconsciously decreases the force of depression slightly after he has ceased to increase the force with which the brake pedal is depressed, a braking force of the same magnitude is maintained, bringing forth an advantage that the brake feeling is improved.

However, in the brake booster which is provided with the reaction transmitting means, when the spring within the reaction transmitting means is compressed, a flow path switching action takes place within the valve mechanism of the brake booster as the spring changes its length, whereby the hysteresis caused by the reaction disc is accommodated by the spring, resulting in the magnitude of an output from the brake booster which remains substantially equal upon depression and upon release of the brake pedal.

As a consequence, if a driver unconsciously decreases the force of depression slightly after he has ceased to increase the force with which the brake pedal is depressed, the braking force will be immediately reduced, and a driver then feels as if the brake is ineffective, thus disadvantageously degrading the brake feeling.

SUMMARY OF THE INVENTION

In view of the foregoing, the invention provides a brake booster which is provided with reaction transmitting means including a spring, but which is capable of maintaining a brake feeling in good condition.

Thus, the invention relates to a brake booster including a valve body slidably disposed within a shell, a valve mechanism disposed within the valve body, an input shaft for driving a valve plunger, which forms part of the valve mechanism, back and forth to switch a flow path in the valve mechanism, an output shaft slidably mounted on the valve body, a reaction disc interposed between one end of the output shaft and the valve plunger, and reaction transmitting means interposed between the reaction disc and the valve plunger for transmitting a brake reaction from the reaction disc to the valve plunger. In accordance with the invention, the reaction transmitting means includes a first and a second reaction transmitting path disposed in parallel for transmitting a brake reaction from the reaction disc to the valve plunger, the first reaction transmitting path including a spring charged to a preset load so that the brake reaction from the reaction disc is transmitted through the spring to the valve plunger while the second reaction transmitting path includes a viscoelastic member so that the brake reaction from the reaction disc is transmitted to the valve plunger through the viscoelastic member.

With the described construction, when the pedal is depressed to actuate the brake booster, the servo ratio can be maintained relatively low in the similar manner as in the prior art until the spring within the reaction transmitting means becomes compressed.

At this time, since the valve plunger causes a compression of the reaction disc through the reaction transmitting means and moves forward, the reaction disc is effective to produce a hysteresis which provides an output from the brake booster of a differing magnitude upon depression and upon release of the brake pedal.

On the other hand, as the spring within the reaction transmitting means becomes compressed, the valve plunger will be advanced relative to the valve plunger by an amount corresponding to the compression of the spring, equivalently resulting in an effect that the brake pedal is further depressed by an amount corresponding to the compression of the spring, thus increasing the servo ratio.

At this time, as the spring within the reaction transmitting means is compressed, the brake reaction from the reaction disc is transmitted to the valve plunger through the spring in the first reaction transmitting path while simultaneously the brake reaction from the reaction disc is transmitted to the valve plunger through the viscoelastic member in the second reaction transmitting path.

When the brake reaction acts upon the viscoelastic member in the second reaction transmitting path, the viscoelastic member is compressed in accordance with the magnitude of the brake reaction, whereby the viscoelastic member is effective to provide the hysteresis in the similar manner as the reaction disc.

As a consequence, the hysteresis is provided during an initial phase of operation of the brake booster which is prior to the commencement of the compression of the spring and during which the servo ratio is in a low range and during a later phase which is after the commencement of compression of the spring and during which the servo ratio is in a greater range, thus enabling the brake feeling to be maintained in good condition.

Above and other objects and advantages of the invention will become apparent from the following description of several embodiments of the invention with reference to the attached drawings.

DETAILED DESCRIPTION OF THE EMBODIMENTS

Figure 1:
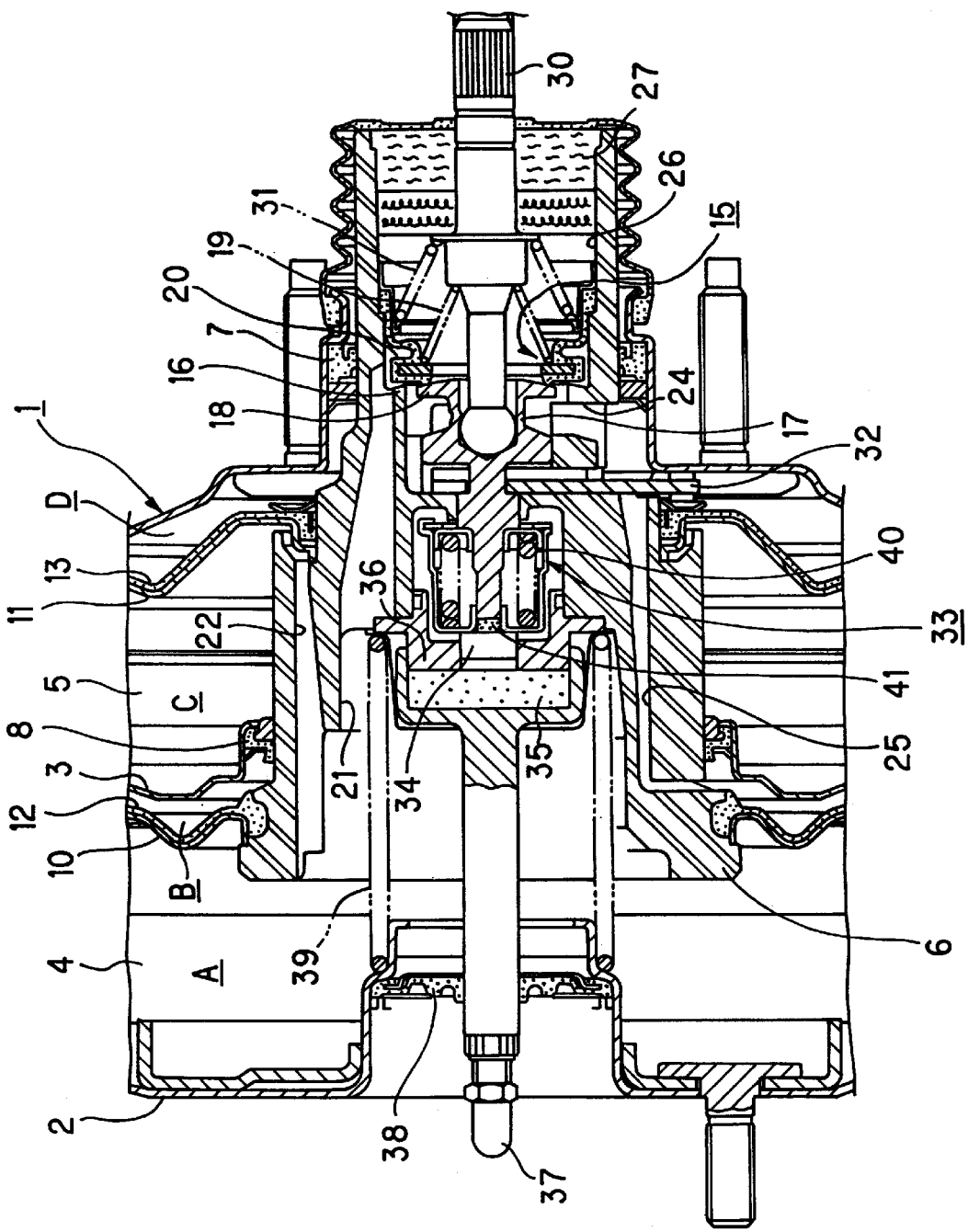
FIG. 1 is a cross section of a first embodiment of the invention.

Several embodiments of the invention will now be described. Referring to FIG. 1, a brake booster 1 of tandem type includes a shell 2, the interior of which is divided by a centerplate 3 to define a front chamber 4 and a rear chamber 5 thereacross. A tubular valve body 6 slidably extends through the rear side of the shell 2 and the centerplate 3, with seal means 7, 8 maintaining a hermetic seal thereat.

A front power piston 10 and a rear power piston 11 are connected to the outer periphery of the valve body 6 in regions which are located within the front chamber 4 and the rear chamber 5, respectively, and a front diaphragm 12 and a rear diaphragm 13 are applied to back surfaces of the power pistons 10, 11, respectively. In this manner, a constant pressure chamber A and a variable pressure chamber B are defined across the front diaphragm 12 within the front chamber 4 while a constant pressure chamber C and a variable pressure chamber D are defined across the rear diaphragm 13 within the rear chamber 5.

A valve mechanism 15 is disposed within the valve body 6 and operates to switch a communication between the constant chambers A, C and the variable pressure chambers B, D. The valve mechanism 15 comprises an annular, first valve seat 16 formed around the valve body 6, an annular, second valve seat 18 formed on the rear side of a valve plunger 17 which is slidably disposed within the valve body 6 at a location radially inward of the first valve seat 16, and a valve element 20 adapted to be seated upon either valve seat 16 or 18 under the influence of a poppet return spring 19.

A space radially outward of an annular seat area on the valve element 20 which moves into engagement with or disengagement from the first valve seat 16 communicates with the constant pressure chamber A through a first constant pressure passage 21 formed in the valve body 6, and the interior of the constant pressure chamber A communicates with the constant pressure chamber C through a second constant pressure passage 22. The constant pressure chamber A communicates with a source of negative pressure through a tubing (not shown) for introducing a negative pressure which is connected to the shell 2, whereby the negative pressure is normally introduced into the constant pressure chambers A and C.

A space located radially inward of the annular seat area on the valve element 20 which moves into engagement with or disengagement from the first valve seat 16, but radially outward of a seat area on the valve element 20 which moves into engagement with or disengagement from the second valve seat 18 communicates with the variable pressure chamber D through a radially extending, first variable pressure passage 24 formed in the valve body 6, and the variable pressure chamber D communicates with the variable pressure chamber B through a second variable pressure passage 25 formed in the valve body 6.

Finally, a space located radially inward of the annular seat area on the valve element 20 which moves into engagement with or disengagement from the second valve seat 18 communicates with the atmosphere through a pressure passage 26 formed in the valve body 6 and a filter 27 disposed therein.

The right end of the valve plunger 17 is pivotally connected with a distal end of an input shaft 30, and a valve return spring 31 having a greater resilience than the poppet return spring 19 is disposed between the input shaft 30 and the valve body 6, thus normally maintaining the valve element 20 seated upon the second valve seat 18 on the valve plunger while maintaining the valve element 20 away from the first valve seat 16 on the valve body 6. The other end of the input shaft 30 is coupled to a brake pedal, not shown.

A key member 32 prevents a disengagement of the valve plunger 17 from the valve body 6. The key member 32 is movable back and forth in the axial direction of the valve body 6, and when the brake booster is inoperative, it abuts against the internal surface of the shell 2 to maintain the valve plunger 17 at an advanced position relative to the valve body 6, thus reducing a lost motion of the input shaft 30 at the commencement of operation of the brake booster.

Reaction transmitting means 33, a plate plunger 34 and a reaction disc 35, all of which will be described in detail later, are sequentially disposed forwardly of the valve plunger 17. The plate plunger 34 is slidably fitted in a holder 36 which is fixedly mounted on the front end face of the valve body 6 in a hermetically sealed manner, and the reaction disc 35 is received in a recess formed in one end of an output shaft 37. The recess formed in one end of the output shaft 37 is slidably fitted around the outer peripheral surface of the holder 36, and the front end of the output shaft 37 projects externally of the shell 2 for connection with a piston of a master cylinder, not shown, while maintaining a hermetic seal by means of a seal member 38.

Accordingly, a brake reaction which is transmitted from the piston of the master cylinder is transmitted to the reaction disc 35 through the output shaft 37, and is then accepted by the valve body 6 through the holder 36, and is also transmitted to a brake pedal, not shown, through the plate plunger 34, the reaction transmitting means 33, the valve plunger 17 and the input shaft 30.

The valve body 6 and the power pistons 10, 11 are normally maintained in their inoperative positions shown by a return spring 39 disposed between the shell 2 and the valve body 6.

The reaction transmitting means 33 comprises a parallel combination of a first reaction transmitting path including a coiled spring 40, and a second reaction transmitting path including a viscoelastic member 41 such as formed of rubber.

Figure 2:
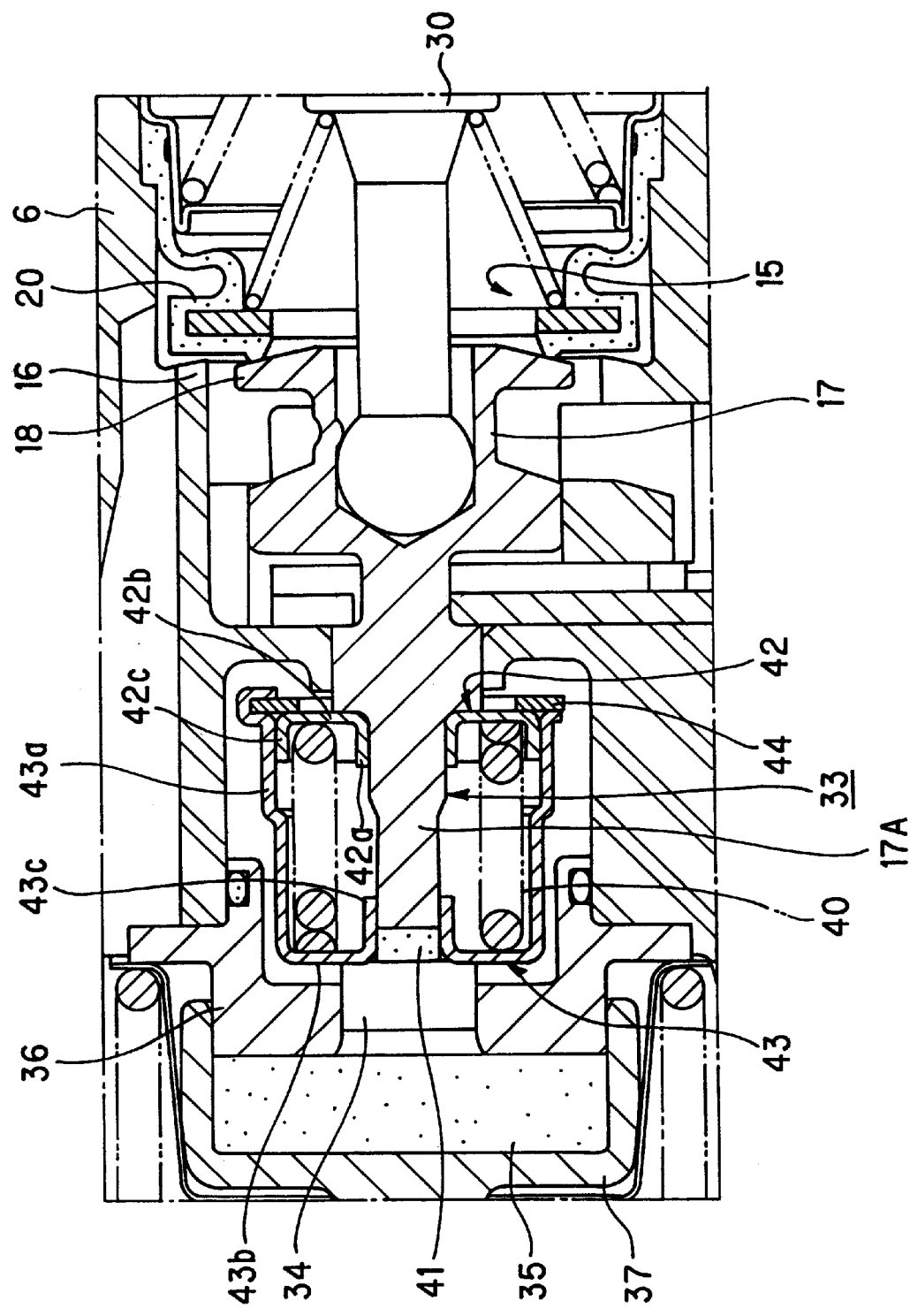
FIG. 2 is a cross section, to an enlarged scale, of part shown in FIG. 1.

As shown to an enlarged scale in FIG. 2, the first reaction transmitting path including the coiled spring 40 comprises four components, namely, a rearwardly located, first retainer 42, a forwardly located, second retainer 43, the coiled spring 40 disposed between the both retainers 42 and 43, and a stop member 44.

The first retainer 42 which is rearwardly disposed includes an inner tubular portion 42a which is fitted around one end of a projection 17A formed on the distal end of the valve plunger 17, a radial portion 42b extending radially outward from the rear end of the inner tubular portion 42a and abutting against a stepped end face of the valve plunger 17, and an outer tubular portion 42c extending forwardly from the outer periphery of the radial portion 42b.

On the other hand, the second retainer 43 which is located forwardly includes an outer tubular portion 43a which surrounds the first retainer 42, a radial portion 43b extending radially inward from the front end of the outer tubular portion 43a and abutting against the rear end face of the plate plunger 34, and an inner tubular portion 43c extending axially rearward from the inner periphery of the radial portion 43b and slidably fitted around the front end of the projection 17A of the valve plunger 17.

The coiled spring 40 is disposed between the radial portion 42b of the first retainer 42 and the radial portion 43b of the second retainer 43, and the first retainer 42, the second retainer 43, the coiled spring 40 and the stop member 44 are integrally assembled together by causing the ring-shaped stop member 44 which is secured to the outer tubular portion 43a of the second retainer 43 to abut against the rear side of the first retainer 42 while maintaining the coiled spring 40 compressed to a given degree.

Accordingly, in the first reaction transmitting path, a brake reaction from the plate plunger 34 is transmitted to the valve plunger 17 through the second retainer 43, the coiled spring 40 and the first retainer 42.

On the other hand, the viscoelastic member 41 in the second reaction transmitting path is disposed inside the inner tubular portion 43c of the second retainer 43 and is disposed between the plate plunger 34 and the front end face of the projection 17A of the valve plunger 17.

Accordingly, in the second reaction transmitting path, a brake reaction from the plate plunger 34 is transmitted to the valve plunger 17 through the viscoelastic member 41.

In the described arrangement, when the brake pedal is depressed to drive the input shaft 30 and the valve plunger 17 forward, the reaction transmitting means 33 is integrally driven forward while maintaining the condition shown in FIG. 2, and hence the plate plunger 34 is also driven forward until the force of depression exceeds the preset load to which the coiled spring 40 is charged.

As the valve plunger 17 is driven forward, a flow path in the valve mechanism 15 is switched to introduce the atmosphere into the variable pressure chamber B, whereby a pressure differential between the constant pressure chamber A and the variable pressure chamber B is effective to drive the power pistons 10, 11 and the valve body 6 forward to thereby drive the output shaft 37 forward, causing a braking liquid pressure to be generated in the master cylinder, generally in the similar manner as in a conventional brake booster.

A brake reaction which results from the braking liquid pressure is transmitted through the output shaft 37 to the reaction disc 35, and thence through the plate plunger 34, the reaction transmitting means 33, the valve plunger 17 and the input shaft 30 to the brake pedal.

At this time, it will be seen that the spacing between the first retainer 42 and the second retainer 43 remains constant until the preset load to which the coiled spring 40 is charged is exceeded in the reaction transmitting means 33, and accordingly, the spacing between the valve plunger 17 and the plate plunger 34 is also constant, whereby the viscoelastic member 41 cannot be compressed between the valve plunger 17 and the plate plunger 34.

Thus, the force applied from the viscoelastic member 41 to the valve plunger 17, or the brake reaction remains constant, and accordingly, the brake reaction is transmitted to the brake pedal only through the first reaction transmission path of the reaction transmitting means 33.

At this time, the valve plunger 17 acts through the plate plunger 34 to compress the reaction disc 35, so that the relationship between the force of depression upon release of the brake pedal and the brake booster 1 exhibits the hysteresis due to the presence of the reaction disc 35 which represents a viscoelastic member.

Figure 3:
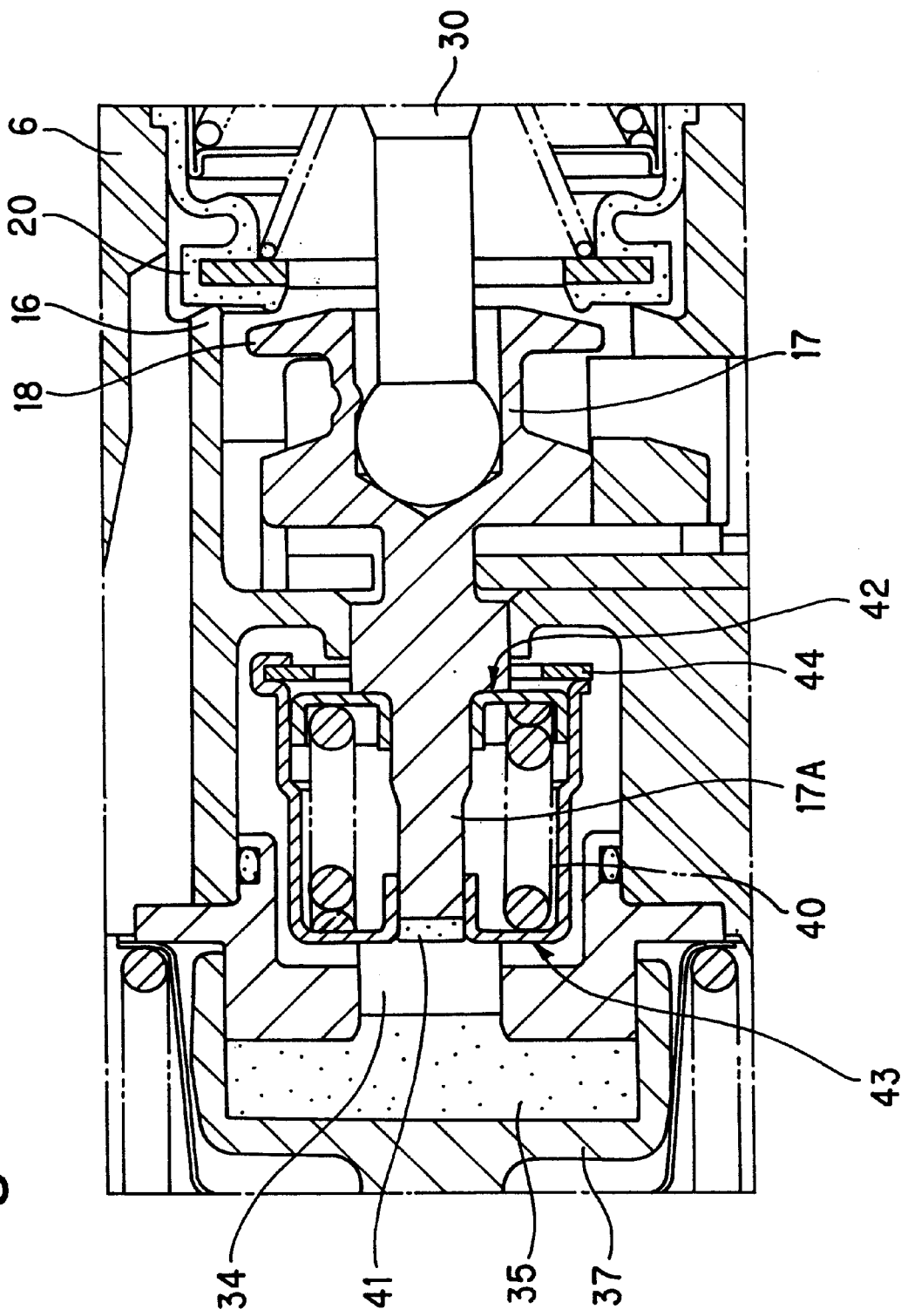
FIG. 3 is a cross section showing the operational condition of the part shown in FIG. 2.

Subsequently, when the force with which the brake pedal is depressed increases to increase the output from the brake booster 1, the brake reaction increases in a corresponding manner, and when the reaction exceeds the preset load to which the coiled spring 40 is charged, the first retainer 42 and the valve plunger 17 will be advanced relative to the second retainer 43 and the plate plunger 34 to reduce the spacing between the plate plunger 34 and the valve plunger 17, as shown in FIG. 3. Thus, when the brake reaction exceeds the preset load to which the coiled spring 40 is charged, both the coiled spring 40 and the viscoelastic member 41 are compressed.

When the coiled spring 40 and the viscoelastic member 41 are compressed, the first retainer 42 and the valve plunger 17 are advanced relatively by a corresponding amount, whereby the output from the brake booster 1 rises with a servo ratio which is greater than the servo ratio which prevailed previously.

At this time, the brake reaction is transmitted from the second retainer 43 through the compressed coiled spring 40 and the first retainer 42 to the valve plunger 17 in the first reaction transmission path of the reaction transmitting means 33.

In the second reaction transmitting path, as the brake reaction increases, the viscoelastic member 41 becomes compressed, whereby the force applied from the viscoelastic member 41 to the valve plunger 17 increases, with consequence that the brake reaction is transmitted to the valve plunger 17 through the second reaction transmitting path as well as through the first reaction transmitting path.

In the conventional brake booster which is provided with conventional reaction transmitting means in which the viscoelastic member 41 is devoid, as the coiled spring 40 is compressed, the reaction disc 35 will be compressed and deformed. However, the hysteresis effect presented by the reaction disc 35 is accommodated by the coiled spring 40, with result that the valve mechanism 15 switches a flow path in accordance with the extension and shrinkage of the coiled spring 40. Since the coiled spring 40 exhibits little hysteresis effect, a brake feeling is degraded.

However, with the embodiment described above, as long as the coiled spring 40 is being compressed, the viscoelastic member 41 which exhibits the hysteresis is compressed at the same time, whereby the switching of the flow path by the valve mechanism retains the hysteresis effect, thus improving the brake feeling.

As the output from the brake booster 1 continues to increase, with a concomitant increase in the brake reaction, the viscoelastic member 41 presents a greater deformation resistance, whereby the amount of deformation of the coiled spring 40 and the viscoelastic member 41 is reduced, thus reducing the servo ratio.

If the deformation resistance presented by the viscoelastic member 41 increases very high so that the coiled spring 40 and the viscoelastic m ember 41 are no longer substantially deformed by compression, the reaction transmitting means 33 will become equivalent to a rigid body, whereby the servo ratio will be reduced to a value which prevailed before the preset load to which the coiled spring 40 is charged is exceeded.

When a choice is made so that the rear end of the second retainer 43 abuts against the valve body 6 while the coiled spring 40 continues to be compressed, the brake reaction which has been transmitted from the plate plunger 34 to the valve plunger 17 through the reaction transmitting means 33 will be accepted in its entirety by the valve body 6, and hence the brake reaction which has been transmitted to the valve plunger 17 no longer increases.

As a consequence, if the brake pedal is further depressed, the brake reaction cannot exceed a given value, and hence, the valve plunger 17 cannot be pushed back against the valve body 6, whereby the atmosphere continues to be introduced into the variable pressure chamber B to allow the output to be increased without increasing the force of depression, the brake booster 1 eventually reaching a full load condition.

In the described embodiment, the valve plunger 17 is formed with the projection 17A which projects forwardly, and the viscoelastic member 41 is disposed between the projection and the plate plunger 34. However, conversely, the projection 17A may be omitted, while the plate plunger 34 may be formed with a projection which projects rearwardly, and the viscoelastic member 41 may be disposed inside the inner tubular portion 42a of the first retainer 42.

Figure 4:
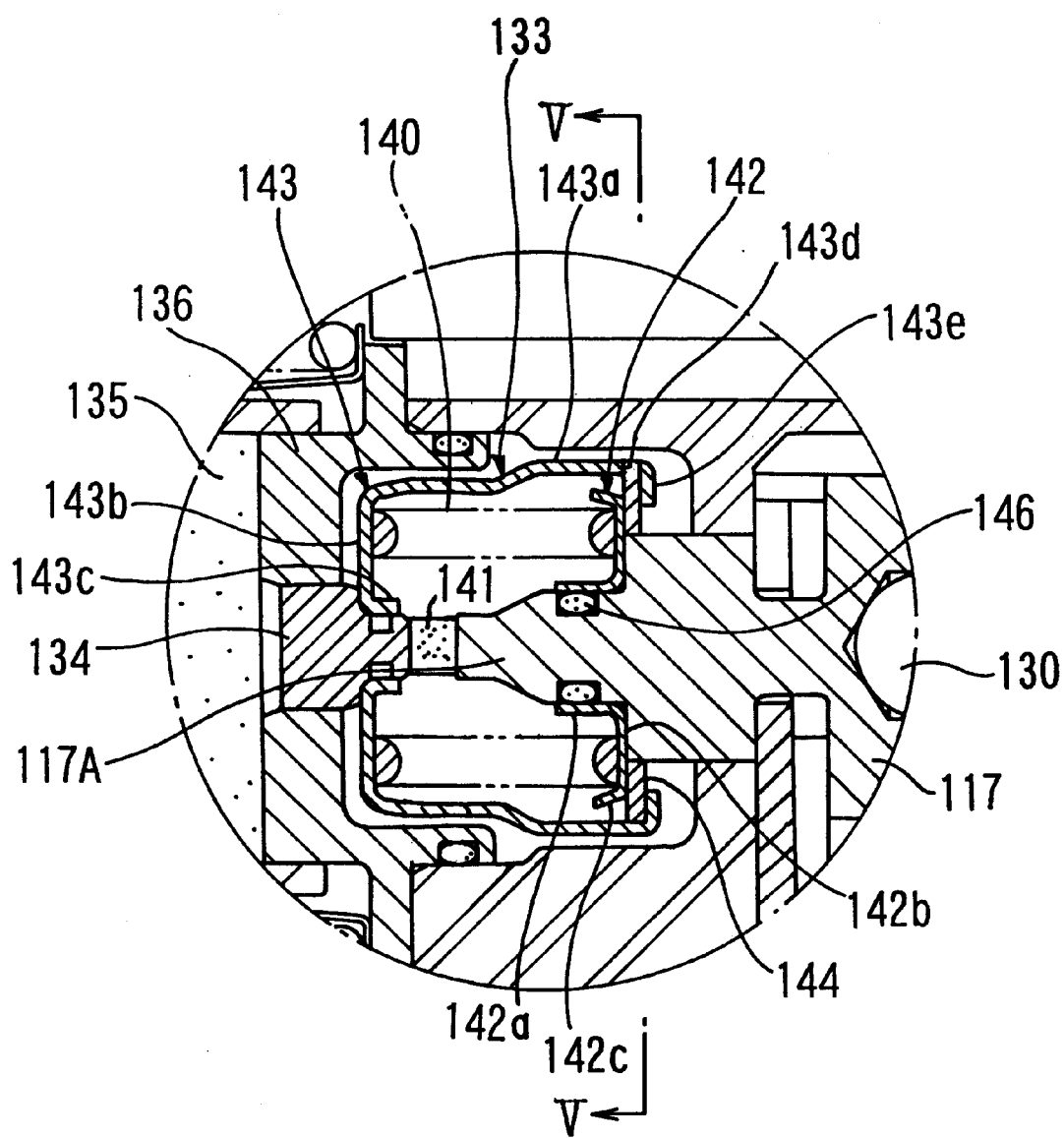
FIG. 4 is a cross section of a second embodiment of the invention.

FIG. 4 shows a second embodiment of the invention. In this embodiment, a valve plunger 117 has a projection 117A in which an annular groove is formed to receive an O-ring 146 as a resilient member, which projects radially outward of the projection 117A. A first retainer 142, which forms reaction transmitting means 133, has an inner tubular portion 142a which is disposed around the outer periphery of the O-ring 146 so as to compress it. Accordingly, the inner tubular portion 142a of the first retainer 142 is held in position by the O-ring 146, whereby when the brake booster is inoperative, the entire reaction transmitting means 133 is held in place.

In the present embodiment, the outer diameter of the projection 117A is slightly tapered in the rearward direction, and at the same time the inner tubular portion 142a of the first retainer 142 is similarly shaped, thus making the first retainer 142 less susceptible to withdrawal in the forward direction.

Accordingly, in the first reaction transmitting path, a brake reaction from a plate plunger 134 is transmitted through a second retainer 143, a coiled spring 140 and the first retainer 142 to the valve plunger 117.

On the other hand, a viscoelastic member 141 in the second reaction transmitting path is adhesively bonded to the front end face of the projection 117A of the valve plunger 117, and thus is disposed between the projection 117A and the plate plunger 134. Accordingly, in the second reaction transmitting path, a brake reaction from the plate plunger 134 is transmitted to the valve plunger 117 through the viscoelastic member.

In other respects, the arrangement is constructed in the similar manner as in the first embodiment, and accordingly, major parts which are similar to those shown in the first embodiment are designated by like reference numerals as used in the first embodiment, to which "100" is added.

In the present embodiment, not only the similar functioning and effect are achieved as in the first embodiment, but at the same time, the reaction transmitting means 133 is secured to the valve plunger 117 by means of the O-ring 146, whereby it is possible to prevent a movement of the reaction transmitting means 133 back and forth in the axial direction to produce sounds of percussion when the brake booster is inoperative.

Figure 5:
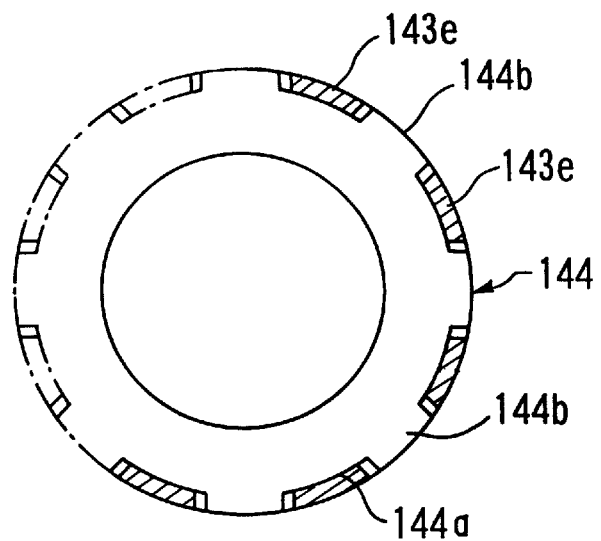
FIG. 5 is a cross section taken along the line V—V shown in FIG. 4.

As shown in FIGS. 4 and 5, in the second embodiment, the outer periphery 144a of a ring-shaped stop member 144 is formed with a plurality of radially outwardly extending ears 144b at an equal interval circumferentially while the rear end of the outer tubular portion 143a of the second retainer 143 is formed with a plurality of slits 143d which are engaged by the respective ears 144b, thereby providing the rear end of the outer tubular portion 143a which is located between the slits 143d to serve as a caulked portion 143e.

Under the condition that the coiled spring 140 is disposed between the radial portion 142b of the first retainer 142 and the radial portion 143b of the second retainer 143, and each ear 144b on the stop member 144 is held in abutment against the bottom surface of the respective slit 143d against the resilience of the coiled spring 140, the caulked portion 143e is caulked by bending it radially inward, thus assembling the stop member 144, the first retainer 142, the second retainer 143 and the coiled spring 140 in an integral manner.

The inner peripheral surface of the stop member 144 is slidably fitted around the outer peripheral surface of the valve plunger 117 at a location rearward of the first retainer 142, thus spacing the outer tubular portion 143a of the second retainer 143 from the outer tubular portion 142c of the first retainer 142.

Accordingly, when the coiled spring 140 is compressed, the stop member 144 which is integral with the second retainer 143 slide s with respect to the valve plunger 117, but because the stop member 144 is ringshaped, it is easy to form its sliding surface to a high precision , thus permitting the suppression of occurrence of extraneous sound during the sliding movement.

When caulking the s top member 144 to the second retainer 143, the outer tubular portion 143a of the second retainer 143 is formed with the slit 143d to permit an abutment of the ear 144b of the stop member 144 against the end face thereof, thus allowing the outer diameter of the outer tubular portion 143a to be increased.

Specifically, when forming the slit 143d and the ear 144b, if the outer tubular portion 143a of the second retainer 143 were formed with a portion of a greater diameter which is extended radially outward so that the outer periphery of the stop member 144 may be disposed in abutment against a stepped end face of the greater diameter portion, whereupon the rear part of the greater diameter portion is caulked, there results a portion of a greater diameter due to the outer tubular portion 143a.

If it is desired to maintain the inner diameter of a region of the valve body 106 where the reaction transmitting means 133 is received constant, the use of the present embodiment which does not include a greater diameter portion permits the outer diameter of the outer tubular portion 143a to be increased, and thus the outer diameter of the coiled spring 140 which is received inside the outer tubular portion 143a can increased, thus enhancing the freedom of design of the coiled spring 140.

Figure 6:
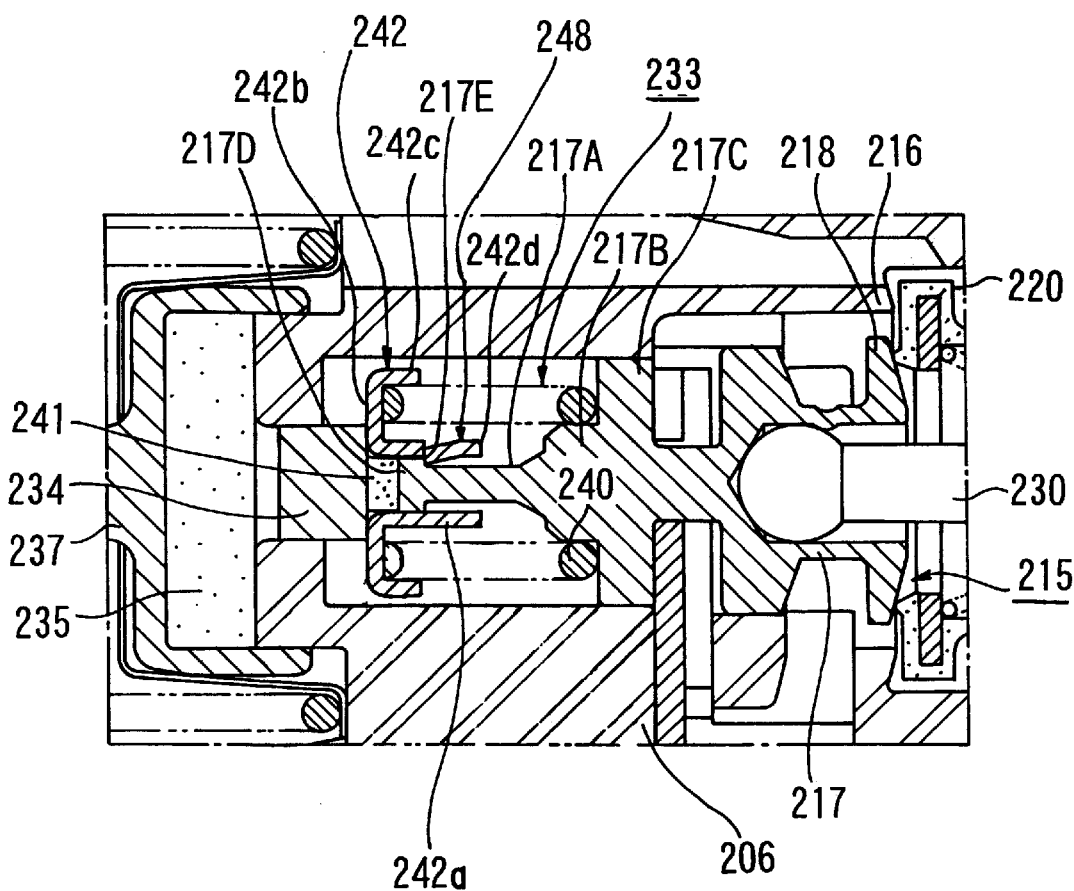
FIG. 6 is a cross section of a third embodiment of the invention.

FIG. 6 shows a third embodiment of the invention. In this embodiment, reaction transmitting means 233 comprises a retainer 242 which is mounted on the distal end of a valve plunger 217 in a displaceable manner, stop means 248 which is effective to prevent the retainer 242 from being withdrawn forwardly from the distal end of the valve plunger 217, and a coiled spring 140 disposed between the retainer 242 and the valve plunger 217.

The retainer 242 comprises an inner tubular portion 242a, a radial portion 242b extending radially outward from the front end of the inner tubular portion 242a for abutment against the rear end face of a plate plunger 234, and a fold-back 242c extending from the outer periphery of the radial portion 242b rearwardly.

The valve plunger 217 comprises a spring abutment 217C extending radially outward from a body 217B and slidably fitted in a valve body 206, and a projection 217A extending forwardly from the distal end of the body 217B.

The stop means 248 comprises a stop 217D of a greater diameter which is formed at the distal end of the projection 217A of the valve plunger 217, and a detent 242d formed on the inner tubular portion 242a of the retainer 242 and projecting radially inward of the inner tubular portion 242a.

The coiled spring 240 is disposed between the radial portion 242b of the retainer 242 and the spring abutment 217C of the valve plunger 217 and is charged to a given load, and then the detent 242d formed on the inner tubular portion 242a is disposed in abutment against the rear end face 217E of the stop 217D, thus integrally assembling the retainer 242 and the coiled spring 240 together with the valve plunger 217.

Accordingly, a brake reaction from the plate plunger 234 is transmitted through the retainer 242 and the coiled spring 240 to the valve plunger 217 in the first reaction transmitting path.

On the other hand, a viscoelastic member 241 in the second reaction transmitting path is disposed inside the inner tubular portion 243c of a second retainer 243, and is disposed between the plate plunger 234 and the projection 217A of the valve plunger 217. Accordingly, a brake reaction from the plate plunger 234 is transmitted through the viscoelastic member 241 to the valve plunger 217 in the second reaction transmitting path.

In other respects, the arrangement is similar to the first embodiment, and accordingly, major parts which are similar to those shown in the first embodiment are designated by like reference numerals as used in the first embodiment, to which "200" is added.

According to the present embodiment, not only the similar functioning and effect can be achieved as in the first embodiment, but the reaction transmitting means 233 is assembled integrally into the distal end of the valve plunger 217, thus permitting the suppression of a movement of the reaction transmitting means 233 back and forth in the axial direction to produce sounds of percussion when the brake booster is inoperative.

In addition, the valve plunger 217 is formed with the spring abutment 217c, against which the rear end of the coiled spring 240 abuts directly, thus allowing the manufacturing cost to be reduced by an amount associated with the omission of the rear retainer in comparison to an arrangement in which the rear end of the coiled spring 240 abuts against the rear retainer.

Figure 7:
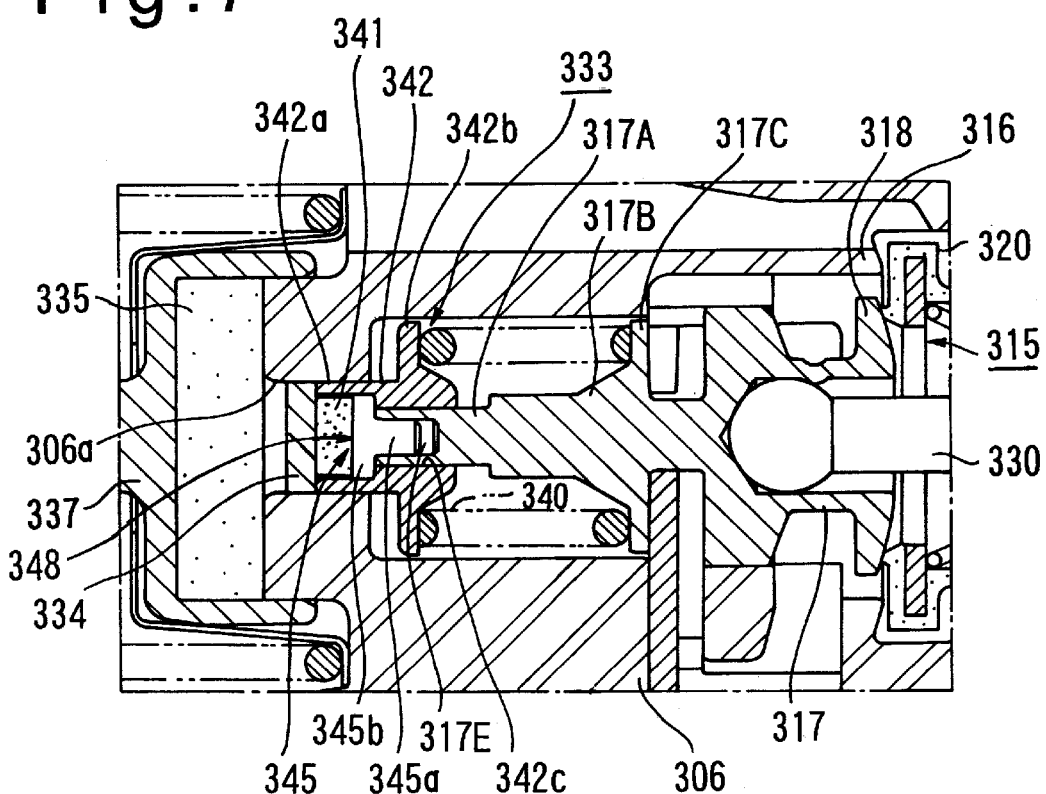
FIG. 7 is a cross section of a fourth embodiment of the invention.

FIG. 7 shows a fourth embodiment of the invention. In the third embodiment, the stop means 248 comprises the stop 217D of the valve plunger 217 and the detent 242d on the retainer 242. By contrast, in the present embodiment, stop means 341 comprises a stepped stop member 345 which is disposed as a press fit into a valve plunger 317. Thus, in the present embodiment, the stop 217D shown in the third embodiment is omitted, and a retainer 342 is slidably fitted around the outer periphery of a projection 317A of the valve plunger 317.

The retainer 342 comprises a tubular portion 342a slidably fitted into a bore 306a of a small diameter formed in a valve body 306, a radial portion 342b extending radially outward from the rear end of the tubular portion 342a in an annular configuration, and a stepped through-opening 342c formed in the tubular portion 342a and having a greater diameter toward the front side. The projection 317A of the valve plunger 317 is slidably fitted into a rearwardly located opening of a reduced diameter of the stepped through-opening 342c.

An opening 317E is formed in the distal end of the projection 317A of the valve plunger 317, and the stepped stop member 345 has a portion 345a of a small diameter which is secured by being a press fit into the opening 317E. The stepped stop member 345 has a portion 345b of a greater diameter which may be utilized to compress a spring 340, disposed between the radial portion 342b of the retainer 342 and the annular projection 317C of the valve plunger 317, to a degree while integrally assembling the retainer 342 and the spring 340 with the valve plunger 317.

In other respects, the arrangement is similar to the third embodiment, and accordingly, major parts which are similar to those shown in the third embodiment are designated by like reference numerals as used in the third embodiment, to which "100" is added.

It is to be noted that the portion 345a of a small diameter of the stepped stop member 345 may be threadably engaged with the opening 317E formed in the distal end of the projection 317A, thus securing the stepped stop member 345 to the distal end of the projection 317A.

Figure 8:
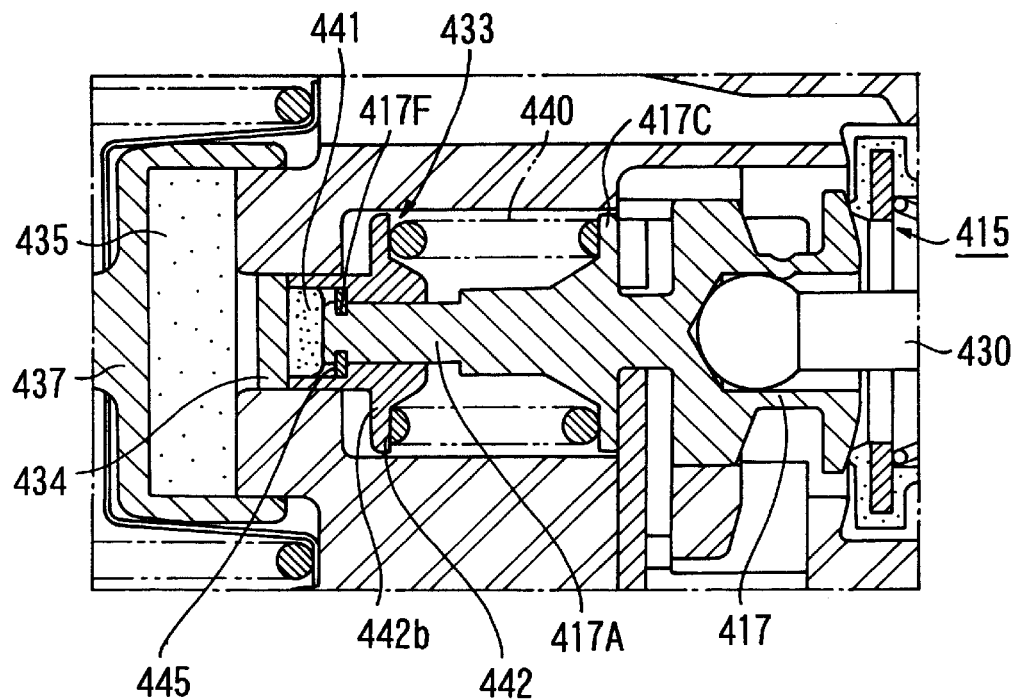
FIG. 8 is a cross section of a fifth embodiment of the invention.

FIG. 8 shows a fifth embodiment of the invention. In this embodiment, stop means 441 includes an annular stop member 445 which is secured to the distal end of a projection 417A of a valve plunger 417. Specifically, a retainer 442 is slidably fitted around the outer periphery of the projection 417A of the valve plunger 417, and the annular stop member 445 is fitted into an annular groove 417F formed in the distal end of the projection 417A, thus securing it in the axial direction. It should be understood that under this condition, a coiled spring 440 is compressed to a degree between a spring abutment 417C of the valve plunger 417 and the radial portion 442b of the retainer 442.

In other respects, the arrangement is similar to the fourth embodiment, and accordingly, major parts which are similar to those shown in the fourth embodiment are designated by like reference numerals as used in the fourth embodiment, to which "100" is added.

It should be understood that the annular stop member 445 may be caulked to the projection 417A. When caulking the annular stop member 445, the distal end of the projection 417A may be previously formed with a tab of a small diameter, and the annular stop member 445 is fitted around the tab, and then the distal end of the tab may be squeezed to cause it to extend radially outward.

Figure 9:
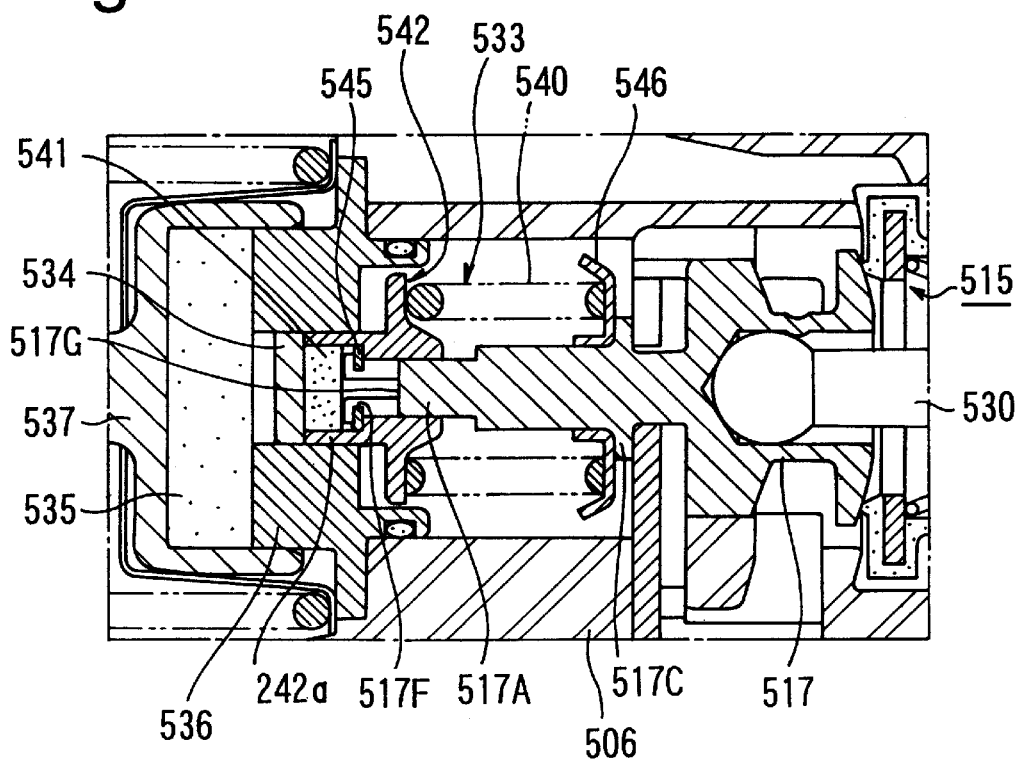
FIG. 9 is a cross section of a sixth embodiment of the invention.

FIG. 9 shows a sixth embodiment of the invention which facilitates a caulking of an annular stop member 545 to a valve plunger 517.

Specifically, a projection projects forwardly from the front end of a projection 517A of the valve plunger 517 and is axially formed with a criss-cross slit 517G. While fitting the annular stop member 545 around the projection thus formed, the distal end of this projection may be easily crushed and deformed utilizing the slit 517G, thus securing the annular stop member 545 to the distal end of the projection 517A of the valve plunger 517.

In this embodiment, the valve plunger 517 has a spring abutment 517C of a reduced diameter, and a plate member 546 is disposed on the spring abutment 517C, with a spring 540 being compressed to a degree between the plate member 546 and the retainer 542.

In addition, in this embodiment, a holder 536 is formed with an opening, in which a plate plunger 534 and the distal end of a tubular portion 542a of a retainer 540 are slidably fitted.

In other respects, the arrangement is similar to the fifth embodiment mentioned above, and accordingly, major parts which are similar to those shown in the fifth embodiment are designated by like reference numerals as used in the fifth embodiment, to which "100" is added.

Figure 10:
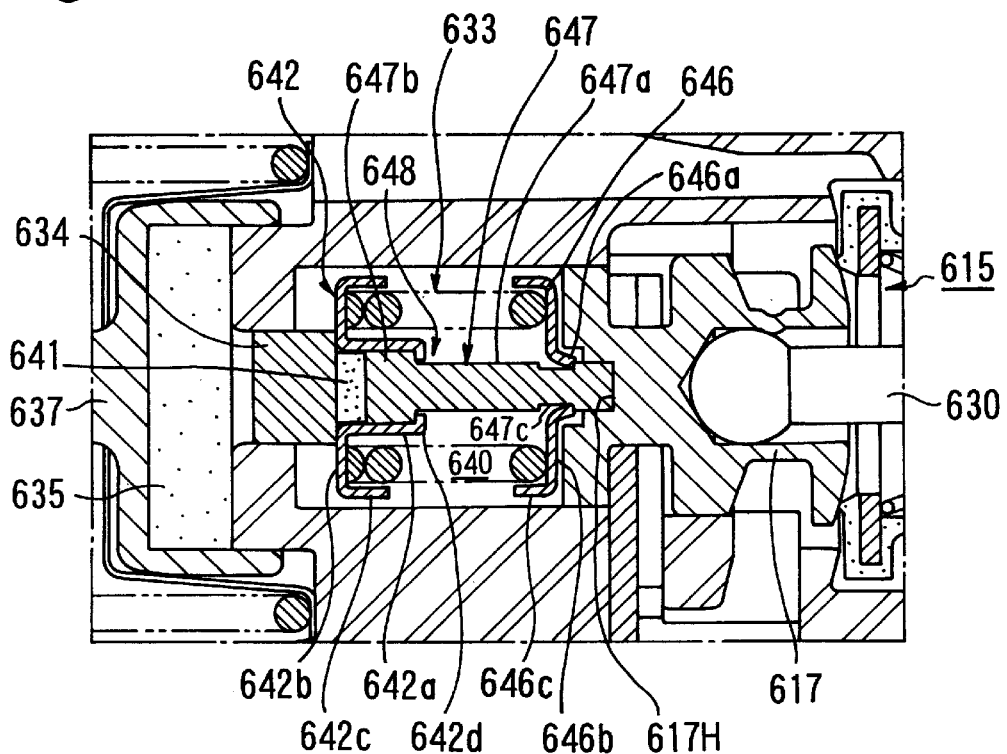
FIG. 10 is a cross section of a seventh embodiment of the invention.

FIG. 10 shows a seventh embodiment of the invention in which reaction transmitting means 633 is assembled initially and is then integrally assembled with a valve plunger 617.

Specifically, the reaction transmitting means 633 comprises a rod member 647 which is equivalent to the projection in above embodiments, a retainer 642 slidably mounted on the front end of the rod member 647, a plate member 646 disposed on the rear side of the rod member 647 and a coiled spring 640 disposed between the retainer 642 and the plate member 646.

The rod member 647 includes a shank 647a, a stop 647b of a greater diameter on the front side of the shank 647a, and an annular recess 647c on the rear side of the shank 647a.

The retainer 642 comprises an inner tubular portion 642a slidably fitted around the stop 647b of the rod member 647, a radial portion 642b extending radially outward from the front end of the inner tubular portion 642a and abutting against the rear end face of a plate plunger 634, a fold-back 642c extending rearwardly from the outer periphery of the radial portion 642b, and a detent 642d formed on the rear portion of the inner tubular portion 642a to define stop means 648. The detent 642d abuts against the rear end face of the stop 647b to prevent the retainer 642 from being withdrawn forwardly from the rod member 647.

The plate member 646 comprises a securing portion 646a disposed toward the inner periphery thereof and tapering in the rearward direction, a radial portion 646b extending radially outward from the front end of the securing portion 646a, and an outer tubular portion 646c extending forwardly from the outer periphery of the radial portion 646b.

A coiled spring 640 is disposed between the retainer 642 and the plate member 646 and is charged to a given load, whereupon the retainer 642, the coiled spring 640 and the plate member 646 are integrally assembled with the rod member 647. The reaction transmitting means 633 assembled in this manner is secured to the valve plunger 617 by disposing the rear end of the shank 647a of the rod member 647 as a press fit into a fitting opening 617H formed in the front end face of the valve plunger 617.

In other respects, the arrangement is similar to the third embodiment mentioned above, and accordingly, major parts which are similar to those shown in the third embodiment are designated to like reference numerals as used in the third embodiment, to which "400" is added.

Figure 11:
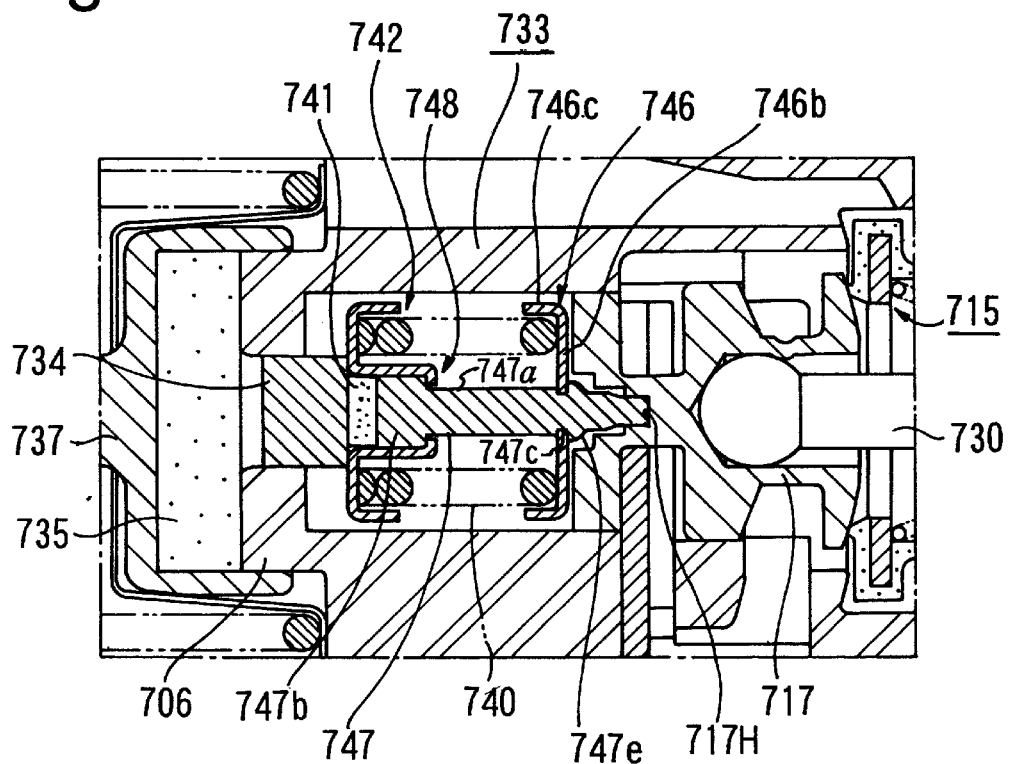
FIG. 11 is a cross section of an eighth embodiment of the invention.

FIG. 11 shows an eighth embodiment of the invention. In the seventh embodiment, the securing portion 646a of the plate member 646 is tapered, but in the present embodiment, the securing portion is dispensed with, and the radial portion 746b of the plate member 746 is directly caulked to a shank 747a of a rod member 747 as shown at 747e.

In other respects, an arrangement is similar to the seventh embodiment, and accordingly, major parts which are similar to those in the seventh embodiment are designated by like reference numerals as used in the seventh embodiment, to which "100" is added.

Figure 12:
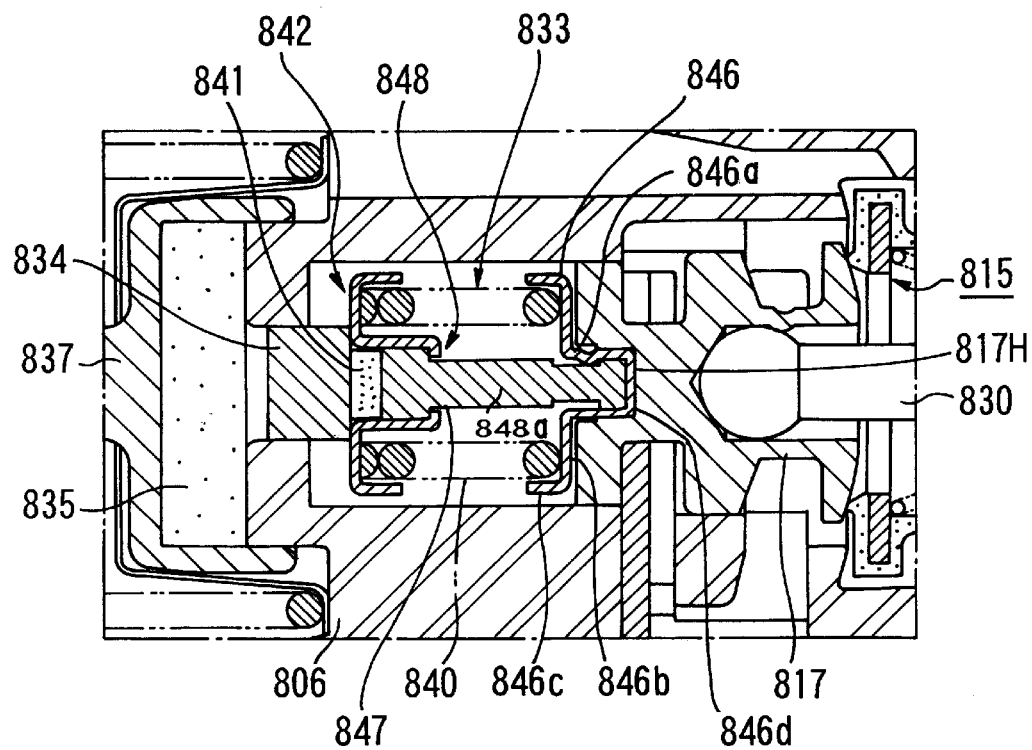
FIG. 12 is a cross section of a ninth embodiment of the invention.

FIG. 12 shows a ninth embodiment of the invention. In the seventh embodiment, the rear end of the shank 647a of the rod member 647 is directly disposed as a press fit into the valve plunger 617. However, in the present embodiment, a plate member 846 has a radial portion 846b, the inner periphery of which is provided with a tubular portion 846d which is adapted to receive the rear end of a shank 847a of a rod member 847. The tubular portion 846d is partly caulked while the rear end of the shank 847a is received within the tubular portion 846d, thus integrally securing the plate member 846 to the rod member 847.

The tubular portion 846d together with the rear end of the shank 847a of the rod member 847 is disposed as a press fit into a fitting opening 817H formed in the valve plunger 817, thus connecting reaction transmitting means 833 to the valve plunger 817.

In other respects, the arrangement is similar to the seventh embodiment, and accordingly, major parts which are similar to those shown in the seventh embodiment are designated by like reference numerals as used in the seventh embodiment, to which "200" is added.

While the invention has been illustrated and described above in connection with several embodiments thereof, it should be understood that a number of changes, substitutions and modifications therein are possible from the above disclosure, and therefore it is intended that the invention be not limited to the specific disclosure given herein, but that the scope of the invention be solely defined by the appended claims.

What is claimed is:

1. A brake booster comprising a valve body slidably disposed within a shell, a valve mechanism comprising a valve plunger disposed within the valve body, an input shaft for driving a valve plunger back and forth to switch a flow path in the valve mechanism, an output shaft slidably mounted in the valve body, a reaction disc interposed between an end of the output shaft and the valve plunger, and reaction transmitting means interposed between the reaction disc and the valve plunger for transmitting a brake reaction from the reaction disc to the valve plunger, characterized in that:

the reaction transmitting means comprises a parallel combination of a first and a second reaction transmission path, each path transmitting a brake reaction from the reaction disc to the valve plunger, the first reaction transmission path comprising a spring biased to a preset load and transmitting a brake reaction from the reaction disc to the valve plunger and the second reaction transmission path comprising a viscoelastic member, wherein the brake reaction is transmitted from the reaction disc through the first reaction transmission path and the viscoelastic member of the second reaction transmission path to the valve plunger as a result of compression of the spring when the brake reaction exceeds the preset load of the spring.

2. A brake booster according to claim 1, further including a plate plunger interposed between the reaction disc and the reaction transmitting means, the first reaction transmission path comprising a first retainer disposed toward the valve plunger, a second retainer disposed toward the plate plunger, a stop member for preventing the first and the second retainer from being spaced apart beyond a given distance, and the spring disposed between the first and the second retainer, the viscoelastic member in the second reaction transmission path being disposed between the plate plunger and the front end face of the valve plunger.

3. A brake booster according to claim 2 in which the second retainer includes an inner tubular portion which extends axially, a projection formed on the front end of the valve plunger slidably extending through the first retainer and being slidably fitted into the inner tubular portion of the second retainer, the viscoelastic member being disposed inside the inner tubular portion.

4. A brake booster according to claim 3 in which the first retainer includes an inner tubular portion which extends axially and which is secured to the projection on the valve plunger by means of a resilient member mounted on the projection.

5. A brake booster according to claim 4 in which each of the projection and the inner tubular portion is tapered in the rearward direction.

6. A brake booster according to claim 2 in which the first retainer includes an inner tubular portion and a radial portion which extends radially outward from the rear end of the inner tubular portion, and in which the second retainer includes an outer tubular portion which surrounds the first retainer, and a radial portion extending radially inward from the front end of the outer tubular portion, the stop member being ring-shaped and having an outer periphery to which the second retainer is connected and an inner periphery which is slidably fitted around the outer periphery of the valve plunger at a location rearward of the first retainer, the spring being disposed between the radial portion of the first retainer and the radial portion of the second retainer and biased to normally maintain the stop member in abutment against the first retainer.

7. A brake booster according to claim 6 in which the outer tubular portion of the second retainer is formed with a plurality of axially extending slits at its rear end, and in which the outer periphery of the stop member is formed with a plurality of ears which project radially outward to be engaged in the respective slits and abut against the bottom surface thereof, the rear end of the outer tubular portion being folded radially inward to secure the stop member to the second retainer.

8. A brake booster according to claim 1, further including a plate plunger interposed between the reaction disc and the reaction transmitting means, the first reaction transmission path comprising a retainer slidably disposed around the outer periphery of a projection formed on the distal end of the valve plunger and projecting forwardly, stop means for preventing the retainer from being withdrawn forwardly from the projection, and the spring interposed between the retainer and a spring abutment formed on the valve plunger, the second reaction transmission path including the viscoelastic member which is disposed inside the retainer and also disposed between the plate plunger and the front end face of the projection from the valve plunger.

9. A brake booster according to claim 8 in which the retainer includes an inner tubular portion and a radial portion extending radially outward from the front end of the inner tubular portion, and the stop means includes a detent formed on the inner tubular portion and projecting inward of the inner tubular portion, and a stop of a greater diameter which is formed on the distal end of the projection from the valve plunger, the inner tubular portion of the retainer being slidably fitted around the outer periphery of the stop, the spring being disposed between the radial portion and the spring abutment on the valve plunger, the detent of the stop means abutting against the rear end face of the stop to prevent the retainer from being withdrawn forwardly from the projection from the valve plunger.

10. A brake booster according to claim 8 in which the stop means includes a stepped stop member secured to the distal end of the projection from the valve plunger, the retainer abutting against a portion of a greater diameter of the stepped stop member, whereby it is prevented from being withdrawn forwardly from the projection from the valve plunger.

11. A brake booster according to claim 8 in which the stop means include an annular stop member secured to the distal end of the projection from the valve plunger, the retainer abutting against the annular stop member, whereby it is prevented from being withdrawn forwardly from the projection from the valve plunger.

12. A brake booster according to claim 11 in which the distal end of the projection from the valve plunger is provided with another projection in which a slit is formed, the annular stop member being fitted around the outer periphery of said another projection, a front portion of said another projection being crushed and deformed radially outward, whereby the annular stop member is caulked to the distal end of the projection from the valve plunger.

13. A brake booster according to claim 8 in which a plate member is interposed between the spring and the spring abutment of the valve plunger, the spring resiliently abutting against the plate member.

14. A brake booster according to claim 1 in which a plate plunger is disposed between the reaction disc and the reaction transmitting means, the first reaction transmission path comprising a retainer slidably fitted around the outer periphery of a rod member connected to the front end of the valve plunger and extending forwardly therefrom, stop means for preventing the retainer from being withdrawn forwardly from the rod member, and the spring disposed between the retainer and a plate member on the valve plunger, the second reaction transmission path including the viscoelastic member disposed inside the retainer and also disposed between the plate plunger and the front end face of the rod member.

15. A brake booster according to claim 14 in which the plate member includes a tubular portion in which a rear portion of the rod member is received, the tubular member being disposed as a press fit into an opening formed in the valve plunger together with the rear portion of the rod member to be secured therein.

* * * * *